(12) United States Patent
Yasumura

(10) Patent No.: US 6,452,817 B1
(45) Date of Patent: Sep. 17, 2002

(54) SWITCHING POWER SUPPLY CIRCUIT

(75) Inventor: Masayuki Yasumura, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/035,396

(22) Filed: Oct. 25, 2001

(30) Foreign Application Priority Data

Oct. 27, 2000 (JP) ........................................ 2000-333545

(51) Int. Cl.[7] .............................................. H02M 3/335
(52) U.S. Cl. ................ 363/21.03; 363/21.02; 363/21.12; 363/19
(58) Field of Search ................. 363/21.02, 21.03, 363/21.12, 18, 19

(56) References Cited

U.S. PATENT DOCUMENTS 6,061,253 A  *  5/2000  Igarashi et al. ................ 363/19

* cited by examiner

*Primary Examiner*—Shawn Riley
(74) *Attorney, Agent, or Firm*—Frommer Lawrence & Haug LLP; William S. Frommer

(57) ABSTRACT

In an insulating converter transformer of a composite resonance type switching power supply circuit having a secondary active clamp circuit, a primary winding and a secondary winding are wound in a so-called inverse winding style, and connected to each other with additive polarity. In this construction, a primary magnetic flux and a secondary magnetic flux act to offset each other, so that no saturation occurs without forming any gap in the core of the insulating converter transformer.

1 Claim, 9 Drawing Sheets

— · — IN THE CASE OF CIRCUIT OF FIG. 7

— · — IN THE CASE OF CIRCUIT OF FIG. 7

— · — IN THE CASE OF CIRCUIT OF FIG. 7

— · — IN THE CASE OF CIRCUIT OF FIG. 7

— · — IN THE CASE OF CIRCUIT OF FIG. 7

SWITCHING POWER SUPPLY CIRCUIT

BACKGROUND OF THE INVENTION

1. Field of the Invention

The present invention relates to a switching power supply circuit equipped to various types of electronic equipment as a power source.

2. Description of the Related Art

There has been widely known a switching power supply circuit using a switching converter of such a type as a fly-back converter or a forward converter. These switching converters are restricted in reduction of switching noises because the switching operation waveform thereof is a rectangular waveform. Further, it has been found that restrictions are imposed on improvements of the power transform efficiency from the viewpoint of the performance characteristics.

Therefore, various types of switching power supply circuits each based on a resonance type converter were previously proposed by the applicant of this application. The resonance type converter can easily achieve a high power transform efficiency, and also it can reduce the noises because the switching operation waveform is a sine wave. Further, there is a merit that it can be constructed by a relatively small number of parts.

FIG. 7 is a circuit diagram showing a conventional switching power supply circuit, which can be constructed on the basis of the invention previously-proposed by the applicant of this application. As the basic construction of the power supply circuit shown in FIG. 7, it is equipped with a voltage resonance type converter as a primary switching converter.

In the power supply circuit shown in FIG. 7, a rectified smoothened voltage Ei corresponding to the level which is once as high as an alternating input voltage VAC is generated from a commercial alternating power source (alternating input voltage VAC) by a bridge rectifying circuit Di and a smoothing capacitor Ci.

At the primary side of the power supply circuit thus constructed, a self-exciting type construction is shown as a voltage resonance type converter circuit for performing a single-end operation by a single-stone switching element Q1. In this case, a bipolar transistor (BJT; junction type transistor) having high resistance to voltage is adopted for the switching element Q1.

The base of the switching element Q1 is connected to the positive polarity side of the smoothing capacitor Ci (rectified smoothened voltage Ei) through a starting resistor (RS), and the base current at the starting time is achieved from the rectifying and smoothing line.

A drive winding NB comprising one turn 1T of winding at the primary side of the insulating converter transformer PIT, and a series resonance circuit for self-exciting driving operation which comprises a series circuit of an inductor LB, a resonance capacitor CB and a base current limiting resistor RB are connected across the base of the switching element Q1 and the earth at the primary side. A switching frequency fs for switching on/off the switching element Q1 is generated by the self-exciting circuit.

A route for clamp current flowing when the switching element Q1 is in off-state is formed by a clamp diode DD1 inserted between the base of the switching element Q1 and the negative polarity (the earth at the primary side) of the smoothing capacitor Ci. Further, the collector of the switching element Q1 is connected to the winding-start edge portion of the primary winding N1 of the insulating converter transformer PIT, and the emitter thereof is connected to the earth.

A parallel resonance capacitor Cr is connected between the collector and emitter of the switching element Q1 in parallel to the switching element Q1. In this case, the primary parallel resonance circuit of the voltage resonance type converter is also formed by the capacitance of the parallel resonance capacitor cr itself and a leakage inductance L1 at the primary winding N1 side of the insulating converter transformer PIT.

The insulating converter transformer PIT is provided to transmit the switching output of the switching converter achieved at the primary side to the secondary side.

The insulating converter transformer PIT is provided with an EE type core comprising ferrite E type cores CR1, CR2 as shown in FIG. 8. In the insulating converter transformer PIT, divided bobbins B are used, and the primary winding N1 and the secondary winding N2 both of which are litz wires are wounded around the divided areas as shown in FIG. 8. Here, the primary winding N1 and the secondary winding N2 are wound in the same winding direction.

A gap G is formed for a center magnetic leg of the EE type core as shown in FIG. 8. The leakage inductance in the insulating converter transformer PIT is determined by the gap length of the gap G, and loose coupling based on a required coupling coefficient is achieved. The coupling coefficient k at this time is set to k≈0.85 so that the loose coupling state is achieved, and thus the saturation state is hardly achieved. The gap G can be formed by making the center magnetic leg of the E-type cores CR1, CR2 shorter than two outer magnetic legs, and the gap length in this case is set to about 1 mm.

For the mutual inductance M between the inductance L1 of the primary winding N1 and the inductance L2 of the secondary winding N2, the operation of the insulating converter transformer PIT may be selectively set to a +M operation mode (additive polarity mode: forward operation) or a −M operation mode (subtractive polarity mode: fly-back operation) in accordance with the connection relationship between the polarity (winding direction) of the primary winding N1, the secondary winding N2 and the rectifying diode D0.

For example, assuming that the polarities (winding directions) of the primary winding N1 and the secondary winding N2 are the same, the mutual inductance is set to +M if the circuit is equivalent to the circuit shown in FIG. 9A, and the mutual inductance is set to −M if the circuit is equivalent to the circuit shown in FIG. 9B.

As shown in FIG. 7, the winding-start edge portion of the primary winding N1 of the insulating converter transformer PIT is connected to the collector of the main switching element Q1, and the winding-end edge portion is connected to the line of the rectified smoothened voltage Ei.

Further, the winding-start edge portion of the secondary winding N2 is connected to the earth at the secondary side, and the winding-end edge portion is connected to the positive-polarity terminal of the smoothing capacitor C01 through the rectifying diode D01.

In such a connection style, the additive polarity connection is carried out between the primary winding N1 and the secondary winding N2 of the insulating converter transformer PIT, and this corresponds to the equivalent circuit shown in FIG. 9A.

The switching output of the main switching element Q1 forming the primary voltage resonance type converter is transmitted to the primary winding N1 of the insulating converter transformer PIT having the above construction, and further transmitted to the secondary winding N2 while it is excited.

In this case, at the secondary side of the insulating converter transformer PIT, the secondary parallel resonance capacitor C2 is connected to the secondary winding N2 in parallel as shown in the figure, so that the secondary parallel resonance circuit is formed together with the leakage inductance L2 of the secondary winding N2.

A half-wave rectifying circuit comprising the rectifying diode D01 and the smoothing capacitor C01 is connected to the secondary parallel resonance circuit in the connection style shown in the figure, thereby outputting the secondary DC output voltage E01.

In the power supply circuit thus constructed, the primary side is equipped with the parallel resonance circuit for setting the switching operation to the voltage resonance type, and the secondary side is equipped with the parallel resonance circuit for achieving the voltage resonance operation. In this specification, the switching converter that operates while it is equipped with the resonance circuits at the primary and secondary sides is referred to as "composite resonance type switching converter".

Further, in the power supply circuit, an active clamp circuit 20 is equipped to the secondary side.

That is, as the secondary active clamp circuit 20 are provided an auxiliary switching element Q2 of MOS-FET, a clamp capacitor C3, and a clamp diode DD2 of a body diode. Further, a drive winding Ng1, a capacitor Cg1 and a resistor Rg1 are equipped as a driving circuit system for driving the auxiliary switching element Q2.

A clamp diode DD2 is connected in parallel between the drain and source of the auxiliary switching terminal Q2. As a connection style, the anode of the clamp diode DD2 is connected to the source, and the cathode is connected to the drain.

Further, the drain of the auxiliary switching element Q2 is connected to the connection point between the winding-end edge portion of the secondary winding N2 and the anode of the rectifying diode D01 through the clamp capacitor C3. The source of the auxiliary switching element Q2 is connected to the secondary earth.

Accordingly, the secondary active clamp circuit 20 is constructed by connecting the clamp capacitor C3 to the parallel connection circuit of the auxiliary switching element Q3, the clamp diode DD2 in series. The circuit thus formed is further connected to the secondary parallel resonance circuit in parallel.

Further, as the driving circuit system of the auxiliary switching element Q2, the series connection circuit of capacitor Cg1-resistor Rg1-drive winding Ng1 is connected to the gate of the auxiliary switching element Q2 as shown in the figure. The series connection circuit forms a self-exciting type driving circuit for the auxiliary switching element Q2. That is, a signal voltage is applied from the self-exciting type driving circuit to the gate of the switching element Q2 to carry out the switching operation.

In this case, the driving winding Ng1 is formed at the winding-start edge portion side of the secondary winding N2, and the number of turns is set to 1T (turn), for example.

Accordingly, a voltage excited by an alternating voltage achieved at the primary winding N1 occurs at the drive winding Ng1. In this case, voltages having the opposite polarities are achieved at the secondary winding N2 and the drive winding Ng1 from the viewpoint of the relationship of the winding direction.

The switching operation of the auxiliary switching element Q2 is subjected to PWM control by the control circuit 1 equipped at the secondary side.

That is, the secondary DC output voltage E01 is supplied to the control circuit 1, and the control circuit 1 applies the DC control voltage corresponding to the secondary DC output voltage E01 to the gate of the auxiliary switching element Q2 to control the conduction angle of the auxiliary switching element Q2, whereby the stabilization of the DC output voltage E01 to the variation of the alternating input voltage VAC and the load power Po is carried out.

In the power supply circuit shown in FIG. 7, the winding directions of the primary winding N1 and the secondary winding N2 are the same as shown by the structure of the insulating converter transformer PIT of FIG. 8. Accordingly, magnetomotive force is generated at the primary winding N1 by primary winding current I1 flowing through the primary winding Ni. Likewise, magnetomotive force is generated at the secondary winding N2 by secondary winding current I2 flowing through the secondary winding N2, whereby a primary magnetic flux $\phi 1$ occurs at the primary side while a secondary magnetic flux $\phi 2$ occurs at the secondary side as shown in FIG. 8.

As described above, the primary winding N1 and the secondary winding N2 in the circuit of FIG. 7 are connected to each other with additive polarity, so that the primary magnetic flux $\phi 1$ and the secondary magnetic flux $\phi 2$ work to be added with each other. Accordingly, a magnetic flux represented by $\phi 1+\phi 2$ occurs at the center magnetic leg of the insulating converter transformer PIT.

That is, the primary winding N1 and the secondary winding N2 have the same winding direction and satisfy the additive polarity connection, so that a relatively large magnetic flux comprising the mixture of the primary magnetic flux $\phi 1$ and the secondary magnetic flux $\phi 2$ occurs at the center magnetic leg.

Here, if no gap is formed at the center magnetic leg of the core of the insulating converter transformer PIT (gap length=0), the magnetic flux enters a saturation area of the magnetization curve of the ferrite core under the condition that the load power Po=about 100W, for example. In the specification, the "saturation" situation means the state that the magnetic flux enters such a saturation area of the magnetization curve.

Accordingly, the inductance of the core is sharply reduced, and the main switching element Q1 of BJT may be broken with high probability.

Therefore, the insulating converter transformer PIT is designed so that the loose coupling state based on a required coupling coefficient can be achieved by forming the gap G as shown in FIG. 8, whereby no saturation occurs.

In order to avoid the phenomenon described above and satisfy the regulation range in the case of the power supply circuit having the construction shown in FIG. 7, it is required to manage the gap length of the gap G formed in the insulating converter transformer PIT with the precision of 1 mm±0.1 mm.

In order to satisfy the precision of the gap length described above, it is required to polish the center magnetic leg of each of the E-type core CR1, Cr2 and carry out the manufacturing management with the precision of 0.5 mm±0.05 mm. Accordingly, the manufacturing time is increased because a work of polishing the center magnetic leg of the E type core with high precision is needed, and it is difficult to perform the product management because there is considered such a case that insulating converter transformers which have the same E type cores, but are different in gap length are produced. That is, necessity of forming a gap causes the manufacturing efficiency to be lowered.

When the gap G is formed in the insulating converter transformer PIT, a leakage magnetic flux called as a fringe magnetic flux occurs in the neighborhood of the gap G, so that an eddy current loss occurs at the primary winding N1 and the second winding N2 corresponding to litz wires, and local heat occurs. This heat is transferred to wires under a low temperature, and the temperature of the windings themselves is increased. Accordingly, it has been found that a power loss called as a copper loss is increased and the power transform efficiency is lowered.

Particularly, in the circuit shown in FIG. 7, the high-frequency current amount of the primary winding current I1 flowing in the primary winding N1 and the secondary winding current I2 flowing in the secondary winding N2 is large, so that the heat due to the DC resistance as the litz wire and the eddy current loss in the primary-winding current I1 and the second winding N2 is remarkable.

Further, in the circuit shown in FIG. 7, there occurs such a problem that when the level of the alternating input voltage VAC under a heavy load condition is lowered to the level of about 75 V to 85 V in AC 100 system, an abnormal operation period which is not the ZVS (Zero Voltage Switching) operation occurs as the operation of the primary main switch element Q1. If such a phenomenon lasts, the main switch element Q1 is heated, and it may be broken in a short time.

SUMMARY OF THE INVENTION

Therefore, in view of the foregoing problem, there is provided a switching power supply circuit comprising: switching means formed to have a main switching element for intermittently outputting a DC input voltage; a primary parallel resonance capacitor provided so as to form a primary parallel resonance circuit for making the operation of the switching means a voltage resonance type; an insulating converter transformer having a structure that a required coupling coefficient to establish the loose coupling between the primary side and the secondary side is achieved, the insulating converter transformer transmitting the output of the switching means achieved at the primary side to the secondary side; a secondary resonance circuit formed by connecting a secondary resonance capacitor to a secondary winding of the insulating converter transformer; DC output voltage generating means that receives an alternating voltage achieved at the second winding of said insulating converter transformer to carry out a rectifying operation, thereby achieving a secondary DC output voltage; secondary active clamp means that is formed in parallel to said secondary resonance capacitor so as to have a series connection circuit comprising a clamp capacitor and a secondary auxiliary switching element; and voltage stabilizing means for applying a DC control signal based on the secondary DC output voltage to the secondary auxiliary switching element to execute conduction angle control on the secondary auxiliary switching element to stabilize the secondary DC output voltage, wherein the insulating converter transformer has a core that is not provided with any gap for prohibiting saturation, the primary winding and the secondary winding are wound around the core in the opposite winding directions and the primary winding and the secondary winding are connected to each other so that additive polarity is established.

According to the present invention, there is achieved a so-called composite resonance type switching converter construction in which the primary parallel resonance circuit forming the voltage resonance converter is equipped at the primary side, and the secondary parallel resonance circuit constructed by the secondary winding and the secondary parallel resonance capacitor is equipped at the secondary side. Further, the active clamp circuit is provided at the secondary side, and the voltage stabilizing control is carried out by subjecting the auxiliary switching element of the active clamp circuit to conduction angle control.

On the basis of the above construction, the primary winding and the secondary winding are wound in the insulating converter transformer so that the winding directions thereof are opposite to each other, and the additive polarity connection is carried out on the primary winding and the secondary winding. Accordingly, the magnetic fluxes achieved by the primary winding and the secondary winding act to offset each other, so that the magnetic flux occurring in the core can be reduced and thus the shift to the saturation state can be suppressed. Therefore, the core of the insulating converter transformer in the switching power supply circuit of the present invention is not equipped with any gap which is formed to suppress the saturation.

DETAILED DESCRIPTION OF THE PREFERRED EMBODIMENTS

Preferred embodiments according to the present invention will be described hereunder with reference to the accompanying drawings.

Figure 1:
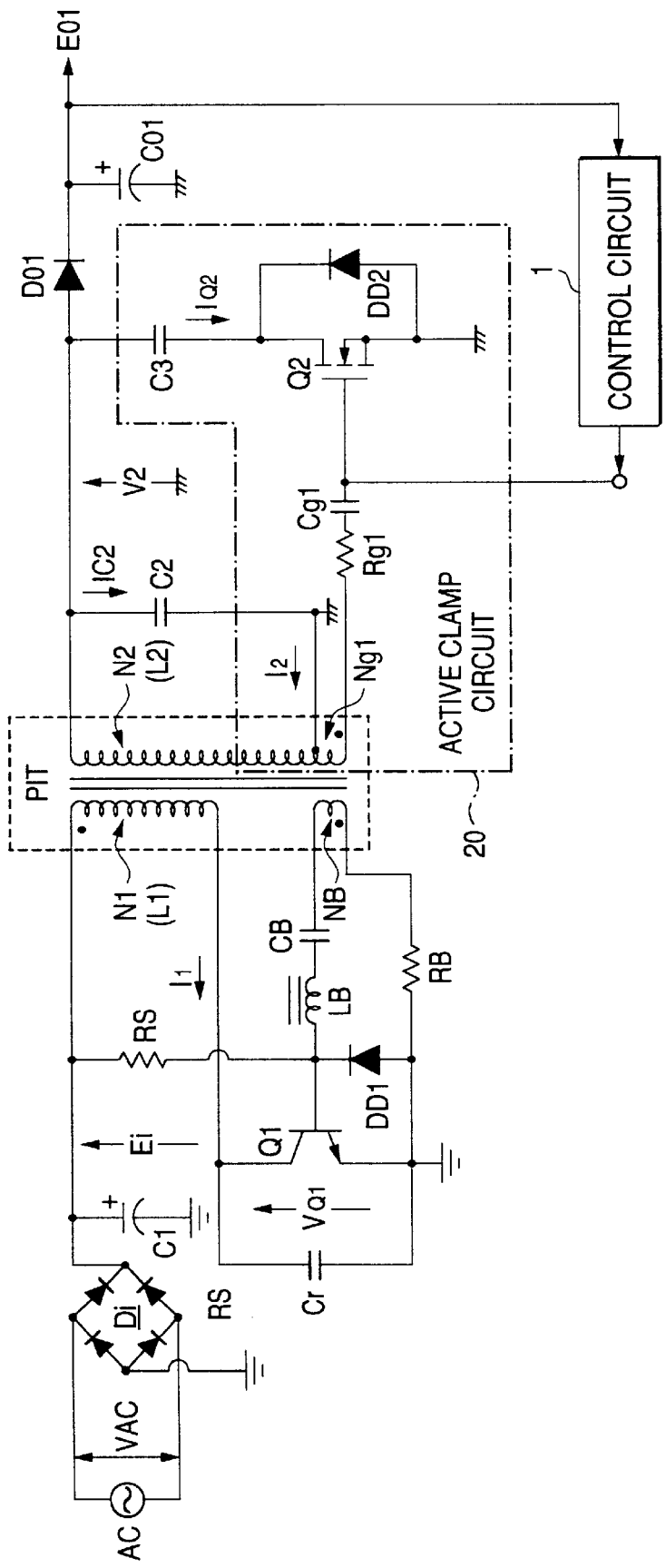
FIG. 1 is a circuit diagram showing the construction of a switching power supply circuit according to a first embodiment of the present invention.

FIG. 1 shows the construction of a switching power supply circuit according to a first embodiment of the present invention.

The power supply circuit shown in FIG. 1 is designed as a composite resonance type switching converter that is equipped with a voltage resonance type converter at the primary side and with an active clamp circuit and a voltage resonance circuit at the secondary side.

In the power supply circuit shown in FIG. 1, a rectified smoothed voltage Ei having the level which is once as high as that of the alternating input voltage VAC is generated from a co a commercial alternating power source (alternating input voltage VAC) by a bridge rectifying circuit Di and a smoothing capacitor Ci.

At the primary side of the power supply circuit, a self-exciting type is constructed as a voltage resonance converter circuit that carries out a single end operation by a single-stone switching element Q1. In this case, a bipolar transistor (BJT: junction type transistor) having high resistance to voltage is used as the switching element Q1.

The base of the switching element Q1 is connected to the positive polarity side of a smoothing capacitor Ci (rectified smoothed voltage Ei) through a starting resistor RS to achieve the base current at the start time from a rectifying and smoothing line.

A driving winding NB which is provided to the primary side of the insulating converter transformer PIT with a winding number of 1T (turn), and a series resonance circuit for self-exciting driving which comprises a series circuit of inductor LB—resonance capacitor CB—base current limiting resistor RB are connected between the base of the switching element Q1 and the earth at the primary side. A switching frequency fs at which the switching element Q1 is turned on/off is generated by this self-exciting circuit. The switching frequency fs is fixed to about 100 KHZ.

A route for clamp current flowing when the switching element Q1 is turned off is formed by a clamp diode DD1 inserted between the base of the switching element Q1 and the negative polarity (the earth at the primary side) of the smoothing capacitor Ci. The collector of the switching element Q1 is connected to the winding end start edge portion of the primary winding N1 of the insulating converter transformer PIT, and the emitter is grounded.

A parallel resonance capacitor Cr is connected between the collector-emitter of the switching element Q1 in parallel. In this case, the primary parallel resonance circuit of the voltage resonance type converter is also formed by the capacitance of the parallel resonance capacitor Cr itself and the leakage inductance L1 of the primary winding N1 side of the insulating converter transformer PIT.

The insulating converter transformer PIT transmits the switching output of the main switching element Q1 to the secondary side.

This embodiment is characterized in the structure of the insulating converter transformer PIT, and this will be described later.

The winding-end edge portion of the primary winding N1 of the insulating converter transformer PIT is connected to the collector of the main switching element Q1, and the winding-start edge portion is connected to the positive polarity (rectified smoothed voltage Ei) of the smoothing capacitor Ci.

At the secondary side of the insulating converter transformer PIT, an alternating voltage induced by the primary winding N1 occurs in the secondary winding N2. In this case, the secondary parallel resonance capacitor C2 is connected to the secondary winding N2 in parallel, and the parallel resonance circuit is formed by the leakage inductance L2 of the secondary winding N2 and the capacitance of the secondary parallel resonance capacitor C2. The alternating voltage induced in the secondary winding N2 becomes a resonance voltage by the parallel resonance circuit. That is, the voltage resonance operation is achieved at the secondary side.

That is, the power supply circuit has the construction as a "composite resonance type switching converter" in which a parallel resonance circuit for making the switching operation a voltage resonance type is equipped at the primary side and a parallel resonance circuit to achieve the voltage resonance operation is equipped at the secondary side.

The secondary side of the power supply circuit thus constructed is equipped with a half-wave rectifying circuit comprising a rectifying diode D01 and a smoothing capacitor C01 to achieve a secondary DC output voltage E01. The DC output voltage E01 is branched and supplied to the control circuit In the control circuit 1, the DC output voltage E01 is used as a detection voltage and an operating power source for the control circuit 1.

Further, the power supply circuit is equipped with an active clamp circuit 20 at the secondary side.

That is, the secondary active clamp circuit 20 comprises an auxiliary switching element Q2 of MOS-FET, a clamp capacitor C3 and a clamp diode DD2 of body diode. Further, a driving circuit system for driving the auxiliary switching element Q2 comprises a drive winding Ng1, a capacitor Cg1 and a resistor Rg1.

A clamp diode DD2 is connected between the drain and source of the auxiliary switching element Q2 in parallel. As a connection style, the anode of the clamp diode DD2 is connected to the source, and the cathode is connected to the drain.

The drain of the auxiliary switching element Q2 is connected to the connection point between the winding-end edge portion of the secondary winding N2 and the anode of the rectifying diode D01 through the clamp capacitor C3. The source of the auxiliary switching element Q2 is connected to the earth at the secondary side.

Accordingly, the secondary active clamp circuit 20 is constructed by connecting the clamp capacitor C3 to the parallel connection circuit of the auxiliary switching element Q3 and the clamp diode DD2 in series. The circuit thus formed is further connected to the secondary parallel resonance circuit (resonance capacitor C2) in parallel.

As shown in the figure, as the driving circuit system of the auxiliary switching element Q2, the series connection circuit of capacitor Cg1—resistor Rg1—drive winding Ng1 is connected to the gate of the auxiliary switching element Q2. The series connection circuit forms a self-exciting type driving circuit for the auxiliary switching element Q2. That is, the signal voltage from the self-exciting type driving circuit is applied to the gate of the switching element Q2 to carry out the switching operation.

The driving winding Ng1 in this case is formed at the winding-start edge portion side of the secondary winding N2, and the number of turns in this case is set to 1T (turn), for example.

Accordingly, a voltage excited by the alternating voltage achieved at the primary winding N1 occurs at the drive winding Ng1. In this case, a voltage having the opposite polarity to the secondary winding N2 and the drive winding Ng1 is achieved due to the relationship of the winding direction.

With respect to the drive winding Ng1, the operation is also guaranteed if the turn number is equal to 1T, however, it is not limited to 1T.

The switching operation of the auxiliary switching element Q2 is subjected to PwM control by the control circuit 1 equipped at the secondary side.

That is, the secondary DC output voltage E01 is supplied to the control circuit 1, and the control circuit 1 applies the DC control voltage corresponding to the secondary DC output voltage E01 to the gate of the auxiliary switching element Q2 to control the conduction angle of the auxiliary switching element Q2, whereby the DC output voltage E01 is stabilized with respect to variation of the alternating input voltage VAC and the load power Po.

Accordingly, there is achieved a system having a very high-speed transit in response to sharp variation of the load power.

In the case of the construction as described above, under the condition that the switching frequency is fixed, there can be achieved such an operation that the on-period is variably controlled in accordance with the level variation of the secondary DC output voltage E01 due to variation of the load or the like with the off period of the auxiliary switching element Q2 being fixed. That is, the operation of variably controlling the conduction angle can be achieved for the switching operation of the auxiliary switching element Q2.

Here, the conduction angle control is carried out so that if a light load state is set and thus the level of the secondary DC output voltage E01 is increased, the on-period of the auxiliary switching element Q2 would be increased.

As a result of the PWM control as described above, with respect to the voltage induced in the secondary winding N2 of the insulating converter transformer PIT, the pulse width of a negative-polarity waveform is increased, and the pulse width of a positive-polarity waveform is shortened.

At the secondary rectifying diode D01, the secondary parallel resonance voltage is input and the rectification is carried out through a forward operation. Therefore, the period for which the secondary rectifying diode D01 is conducted and turned on is shortened, and the other period for which it is turned off is increased. As described above, the conduction angle of the rectifying diode D01 is controlled as a result, so that the secondary DC output voltage is stabilized.

In the construction that the active clamp circuit 20 is equipped at the secondary side as described above, the peak level of the resonance pulse of the secondary parallel resonance circuit (N2//C2) which occurs for the period for which the rectifying diode D01 is turned off is substantially equal to about ½ of the construction that no active clamp circuit is provided.

In this embodiment, the LCR resonance circuit (Rg-Cg-Lg) construction is adopted for the self-exciting driving circuit in the active clamp circuit 20A provided at the secondary side, whereby the switching loss by the auxiliary switching element Q2 is reduced, and the DC-DC power conversion efficiency as the power supply circuit is enhanced to the same level as the construction in which no active clamp circuit is provided.

Figure 2:
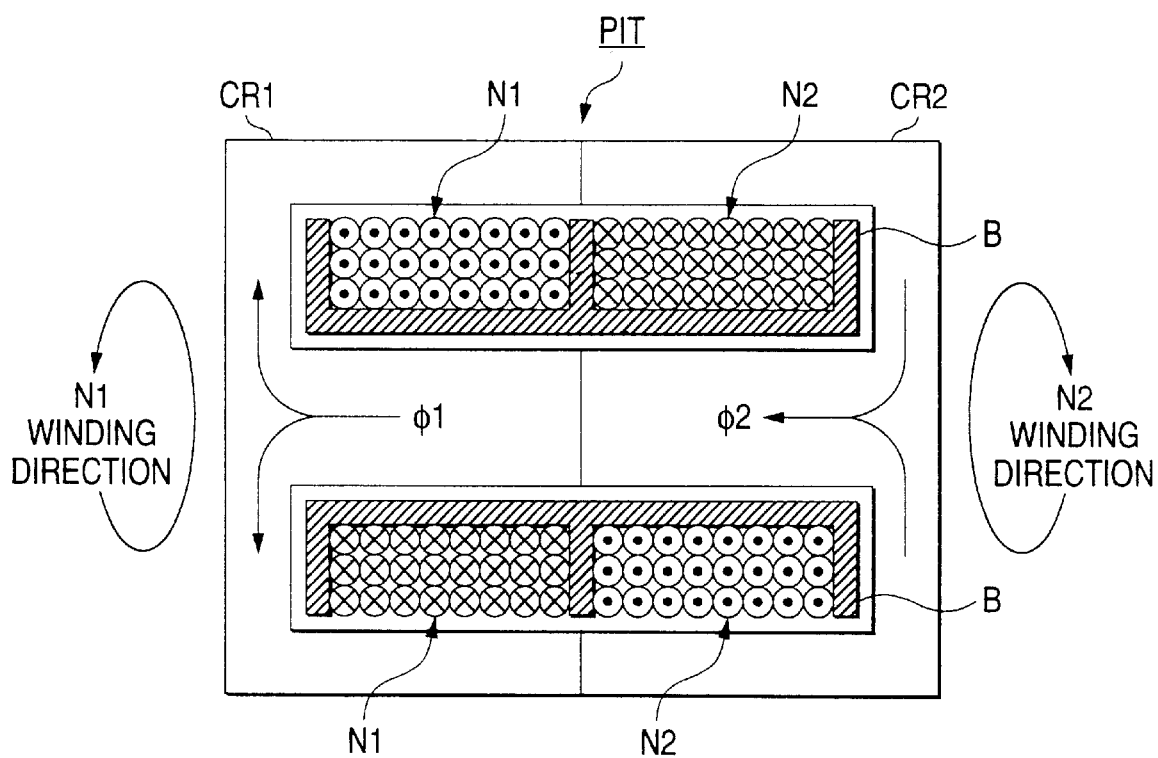
FIG. 2 is a cross-sectional view showing the construction of an insulating converter transformer equipped to the switching power supply circuit of the embodiment.

FIG. 2 shows the construction of the insulating converter transformer PIT equipped to the power supply circuit shown in FIG. 1. In this figure, for convenience in description, the illustration of the driving winding Ng1 is omitted, and the primary winding N1 and the secondary winding N2 are shown.

As shown in the figure, the insulating converter transformer PIT constructs an EE type core by using two E type cores CR1, CR2. A dividing bobbin B is equipped to the EE type core, and the primary winding N1 is wound at the winding area of the E type core CR1 side of the dividing bobbin B while the secondary winding N2 is wound at the winding area of the E type core CR2 side as shown in the figure.

In the case of this embodiment, the winding directions of the primary winding N1 and the secondary winding N2 are set to a so-called inverse winding structure in which the winding directions thereof are opposite to each other as indicated by arrows at the right and left outsides of the core in the figure.

Further, in the case of this embodiment, no gap is formed at the confronting site of the center magnetic legs of the E type cores CR1, CR2.

Here, referring to FIG. 1 again, the connection between the primary winding N1 and the secondary winding N2 of the insulating converter transformer PIT will be described.

Figure 7:
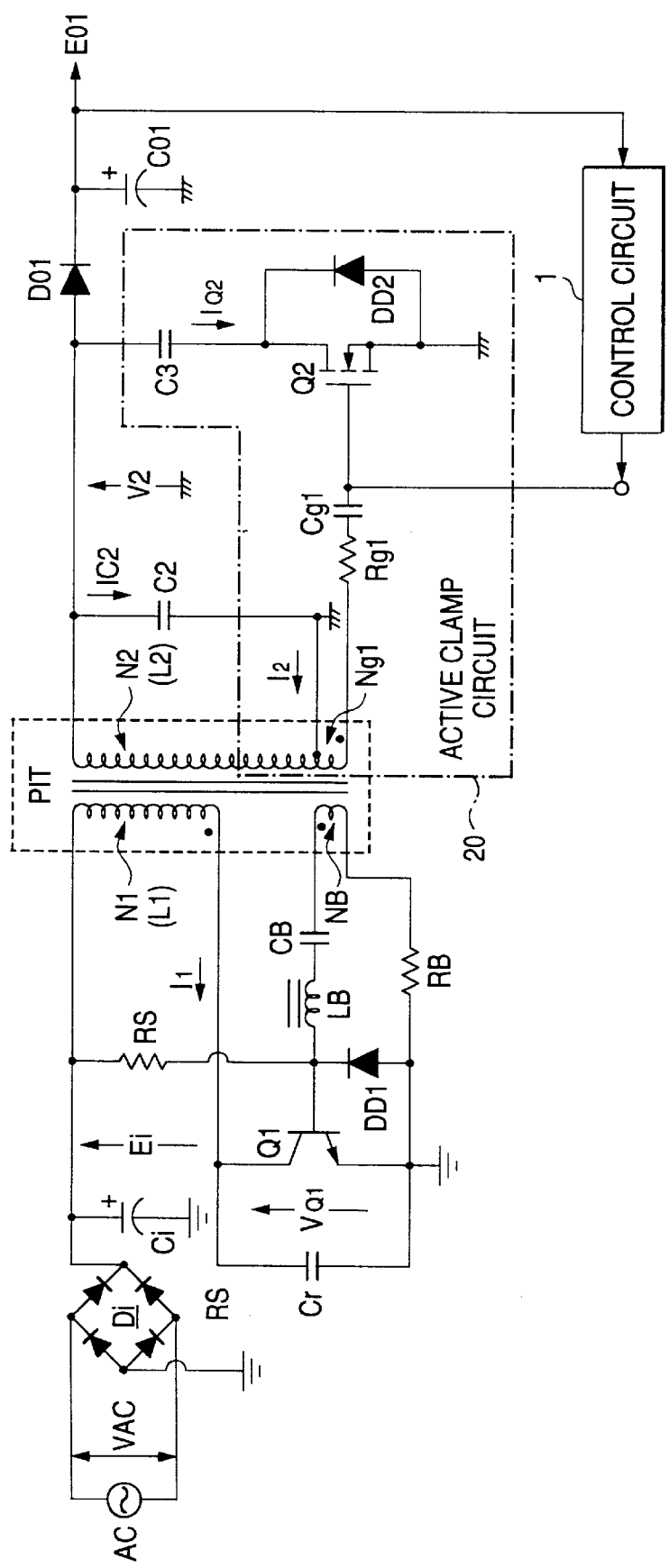
FIG. 7 is a circuit diagram showing the construction of a switching power supply circuit of the prior art.

As shown in FIG. 1, the connections of the winding-start edge portion and winding-end edge portion of the primary winding N1 are opposite to those of the circuit which is shown as a prior art in FIG. 7. That is, in the circuit shown in FIG. 1, the winding-start edge portion of the primary winding N1 is connected to the positive polarity terminal of the smoothing capacitor Ci, and the winding-end edge portion is connected to the collector of the main switching element Q1.

Further, with respect to the secondary winding N2, the winding-end edge portion thereof is connected to the positive polarity terminal of the smoothing capacitance C01 through the rectifying diode D01, and the winding-start edge portion thereof is connected to the earth at the secondary side.

Figure 9A:
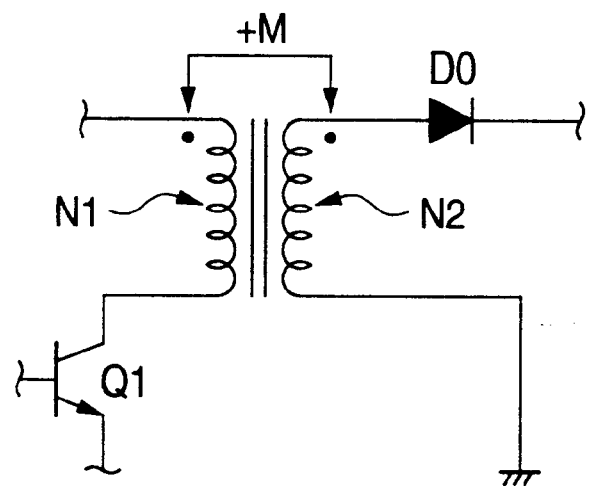
FIGS. 9A and 9B are equivalent circuit diagrams showing each operation when mutual inductance in the insulating converter transformer is an additive polarity mode and a subtractive polarity mode.
Figure 9B:
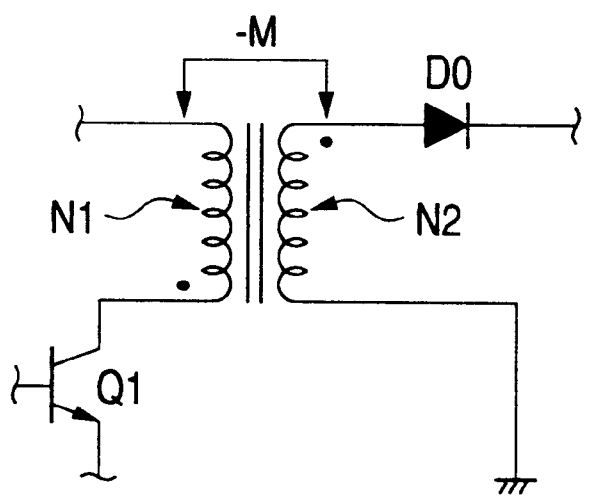

That is, as the power supply circuit shown in FIG. 1, even when the insulating converter transformer PIT having the inverse winding structure of the primary winding N1 and the secondary winding N2 as shown in FIG. 2 is equipped, the primary winding N1 and the secondary winding N2 are connected to each other so that the additive polarity shown in the equivalent circuit of FIG. 9A is established.

According to the construction as described above, the polarity of the primary magnetic flux $\phi1$ generated by the primary winding current I1 flowing in the primary winding N1 and the polarity of the secondary magnetic flux $\phi2$ generated by the secondary winding current I2 flowing in the secondary winding N2 are set as indicated by the arrows shown in the core of FIG. 2. In this structure, the polarity of the primary magnetic flux $\phi1$ is opposite to that of the insulating converter transformer PIT shown as a prior art in FIG. 8. The polarity of the secondary magnetic flux $\phi2$ is the same as the insulating converter transformer PIT of FIG. 8.

In this embodiment, the relationship in polarity between the primary magnetic flux $\phi1$ and the secondary magnetic flux $\phi2$ as shown in FIG. 2 is achieved, and thus the primary magnetic flux $\phi1$ and the secondary magnetic flux $\phi2$ act to offset each other. That is, the magnetic flux ($\Delta\phi$) achieved at the center magnetic leg of the insulating converter transformer PIT is represented by $|\phi1-\phi2|=\Delta\phi$. This shows that the primary magnetic flux $\phi1$ and the secondary magnetic flux $\phi2$ offset each other and they are not added to each other as in the case of the circuit of FIG. 7, for example. Accordingly, in this embodiment, the magnetic flux achieved at the center magnetic leg of the insulating converter transformer PIT may be set to be weaker than ever. As a result, the coupling coefficient k of the primary side and the secondary side may satisfy k=about 0.8 to 0.9 at which the loose coupling state is achieved, for example.

Accordingly, in the insulating converter transformer PIT of this embodiment, it is controlled so that the core is not saturated even when no gap is daringly formed at the center magnetic leg, and no gap is provided as a result as shown in FIG. 2.

Actually, since a so-called core sound that is audible may occur on the coupling face of the center magnetic leg under the condition that the gap length is set to 0, a gap having a gap length of 0.1 mm or less may be formed by applying Mylar film to the coupling face of the center magnetic leg.

Figure 8:
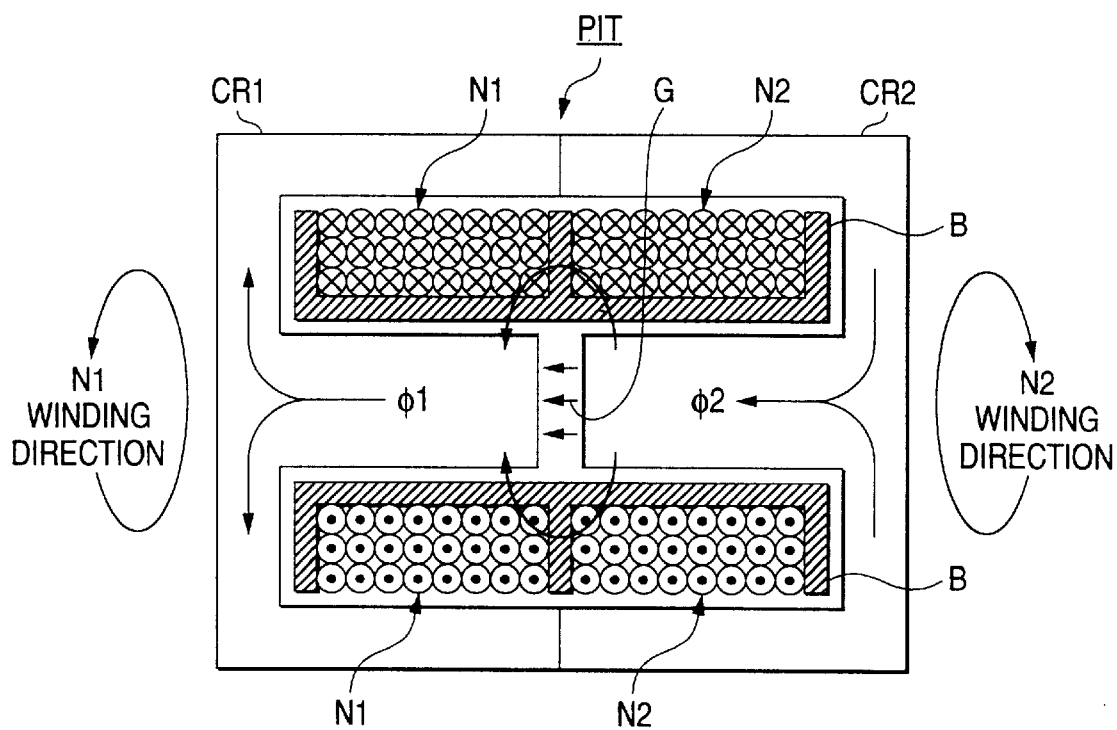
FIG. 8 is a cross-sectional view showing the construction of an insulating converter transformer equipped to the conventional switching power supply circuit.

By constructing the insulating converter transformer PIT as described above, the magnetic flux thus achieved at the center magnetic leg is still weaker than ever, so that the increase in temperature of the winding due to the fringe magnetic flux occurring around the gap and the reduction in power conversion efficiency like the case of FIG. 8 can be overcome.

In the insulating converter transformer PIT of this embodiment, the magnetic flux ($\Delta\phi$) achieved at the center magnetic leg is weak, so that the leakage inductance of the primary winding N1 and the secondary winding N2 is reduced. Accordingly, even under a heavy load condition that the load power Po=about 200W, the main switching element Q1 can implement a stable ZVS operation.

FIGS. 3A to 3E are waveform diagrams showing the operation of the main part in the power supply circuit of FIG. 1 thus constructed. In FIGS. 3A to 3E, the operation under the condition that the alternating input voltage VAS=220V and the load power Po=200W is shown. For comparison, the waveform of the power supply circuit of FIG. 7 is shown by one-dotted chain line.

Figure 3A:
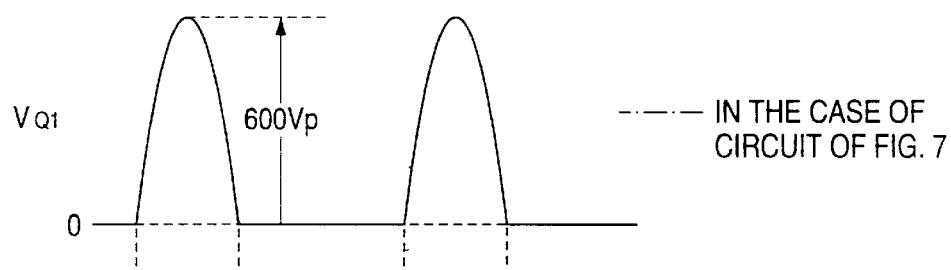
FIGS. 3A to 3E are waveform diagrams showing the operation of the main part of the switching power supply circuit according to the embodiment.
Figure 3B:
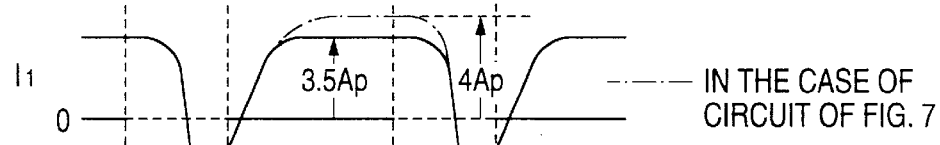

A resonance pulse voltage VQ1 occurs at both the ends of the primary parallel resonance capacitor Cr at a fixed period through the switching operation of the main switching element Q1 as shown in FIG. 3A. At this time, the collector current I1 flowing in the main switching element Q1 as shown in FIG. 3B is achieved. That is, damper current (negative direction) flows in the primary winding N1 through the clamp diode DD1, the base-collector of the main switching element Q1 when the main switching element Q1 is turned on, and when the damper current flowing period is finished, the level of the collector current I1 sharply increases from the negative side to the positive side.

Figure 3C:
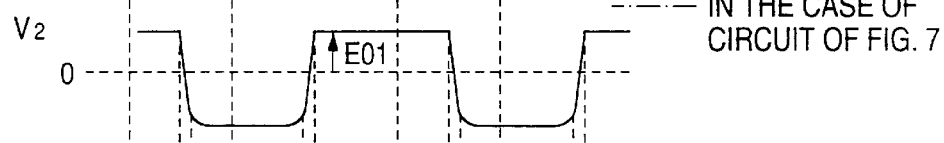
Figure 3D:
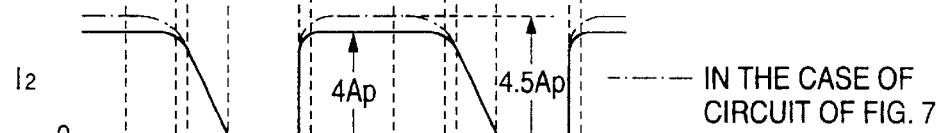
Figure 3E:
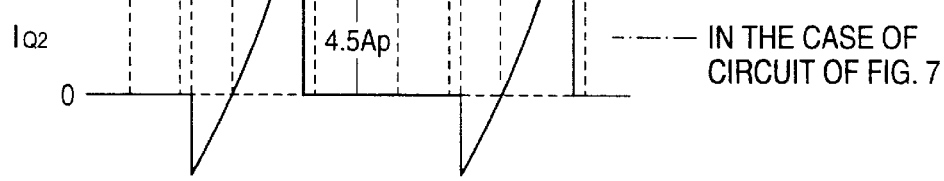

Through the switching operation as described above, resonance current I2 of FIG. 3D flows in the secondary winding N2 of the insulating converter transformer PIT, and a resonance voltage v2 as shown in FIG. 3C occurs in the secondary parallel resonance capacitor C2. For the positive period for which the rectifying diode D01 operates, a voltage clamped to the voltage E01 level is achieved.

By conducting the active clamp circuit 20, the clamp current IQ2 flows in the route of the clamp diode DD2→the clamp capacitor C3, and this provides a saw-tooth wave that flows from the negative direction to the positive direction with time lapse.

When the active clamp circuit 20 is conducted, most of current flows as the clamp current IQ2 in the clamp capacitor C3, and little current flows in the secondary parallel resonance capacitor C2. Therefore, for even the period for which the active clamp circuit 20 is conducted, the resonance voltage V2 is clamped, so that the negative voltage level is restricted as shown in FIG. 3C.

Figure 4A:
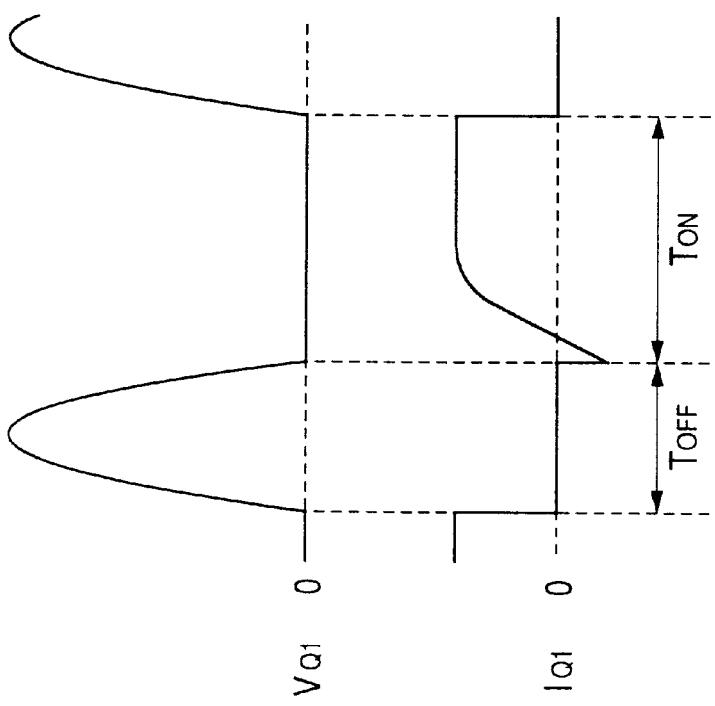
FIGS. 4A and 4B are waveform diagrams to compare ZVS operation between the switching power supply circuit of the embodiment and the prior art.

FIG. 4A shows the primary parallel resonance voltage VQ1 and the switching output current IQ1 flowing in the main switching element Q1. As the condition at this time, the alternating input voltage VAC of the AC 100V system is reduced to about 75V to 85V at a load power Po=200W. For comparison, FIG. 4B shows the waveform in the case of the power supply circuit of FIG. 7.

Figure 4B:
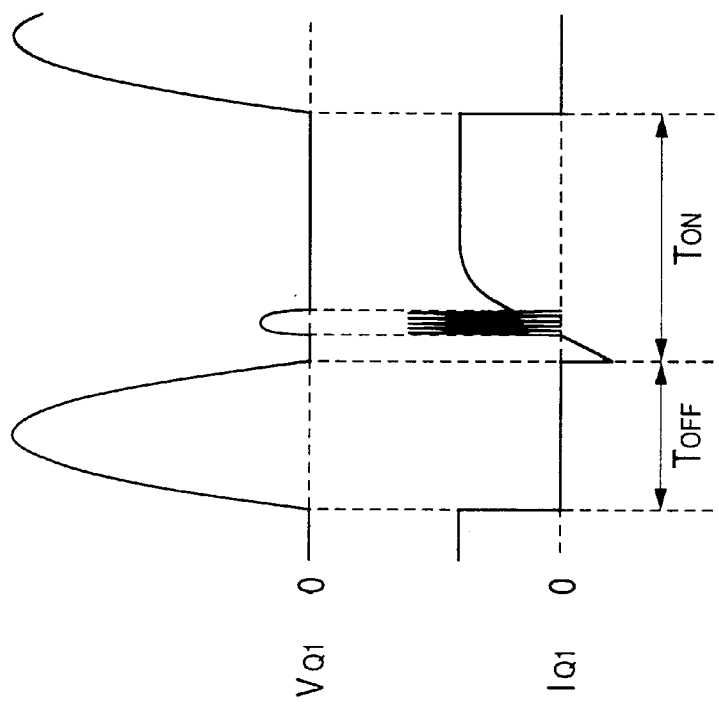

As is apparent from the waveform of FIG. 4B, in the case of the circuit of FIG. 7, there occurs a phenomenon that the primary parallel resonance voltage VQ1 and the switching output current IQ1 appear in the form of pulse at the positive level at the timing that the switching output current IQ1 is inverted from the negative polarity level to the positive polarity level in the period TON. That is, an abnormal operation which is not the ZVS operation is carried out.

On the other hand, in the circuit shown in FIG. 1, as shown in FIG. 4A, the pulse of the primary parallel resonance voltage VQ1 in the period TON is vanished, and the waveform of the switching output current IQ1 becomes normal without no pulse. That is, in this embodiment, it is shown that the ZVS operation is normally carried out even under the condition of a heavy load and a low alternating input voltage.

Here, the specification of the main part of the power supply circuit shown in FIG. 1 will be described.

First, with respect to the insulating converter transformer PIT, a core of EE-40 is adopted, the gap length Gap is set to 0, and N1=50T and N2=45T as the number of turns of the primary winding N1 and the secondary winding N2.

Further, the primary parallel resonance capacitor Cr=5600 pF, the secondary parallel resonance capacitor C2=8200 pF, and the clamp capacitor C3=0.27 $\mu$F.

In the power supply circuit shown in FIG. 7, a core of EE-40 is likewise adopted for the insulating converter transformer PIT, and Gap is set to 1 mm. Further, the primary winding N1=the secondary winding N2=45T, the primary parallel resonance capacitor Cr=6800 pF, the secondary parallel resonance capacitor C2=0.01 $\mu$F, and the clamp capacitor C3=0.33 $\mu$F.

There was achieved a result that the power conversion efficiency of the power supply circuit shown in FIG. 1 was equal to 91.9% for VAC=100V under the load condition: load power Po=200W. On the other hand, in the circuit shown in FIG. 7, it was equal to 90.8% for VAC=100V under the load condition: load power Po=200W.

That is, for the comparison with the prior art, the power conversion efficiency is enhanced by 1.1%. This means that the power loss is reduced by about 2W.

With respect to the temperature increasing value of the insulating converter transformer PIT of the circuit shown in FIG. 1, a great reduction of about 4° C. is achieved for both the primary winding N1 and the secondary winding N2 in the circuit shown in FIG. 7. Specifically, the temperature is reduced from 45° C. to 41° C. for the primary winding N1, and it is reduced from 52° C. to 48° C. for the secondary winding N2.

Figure 5:
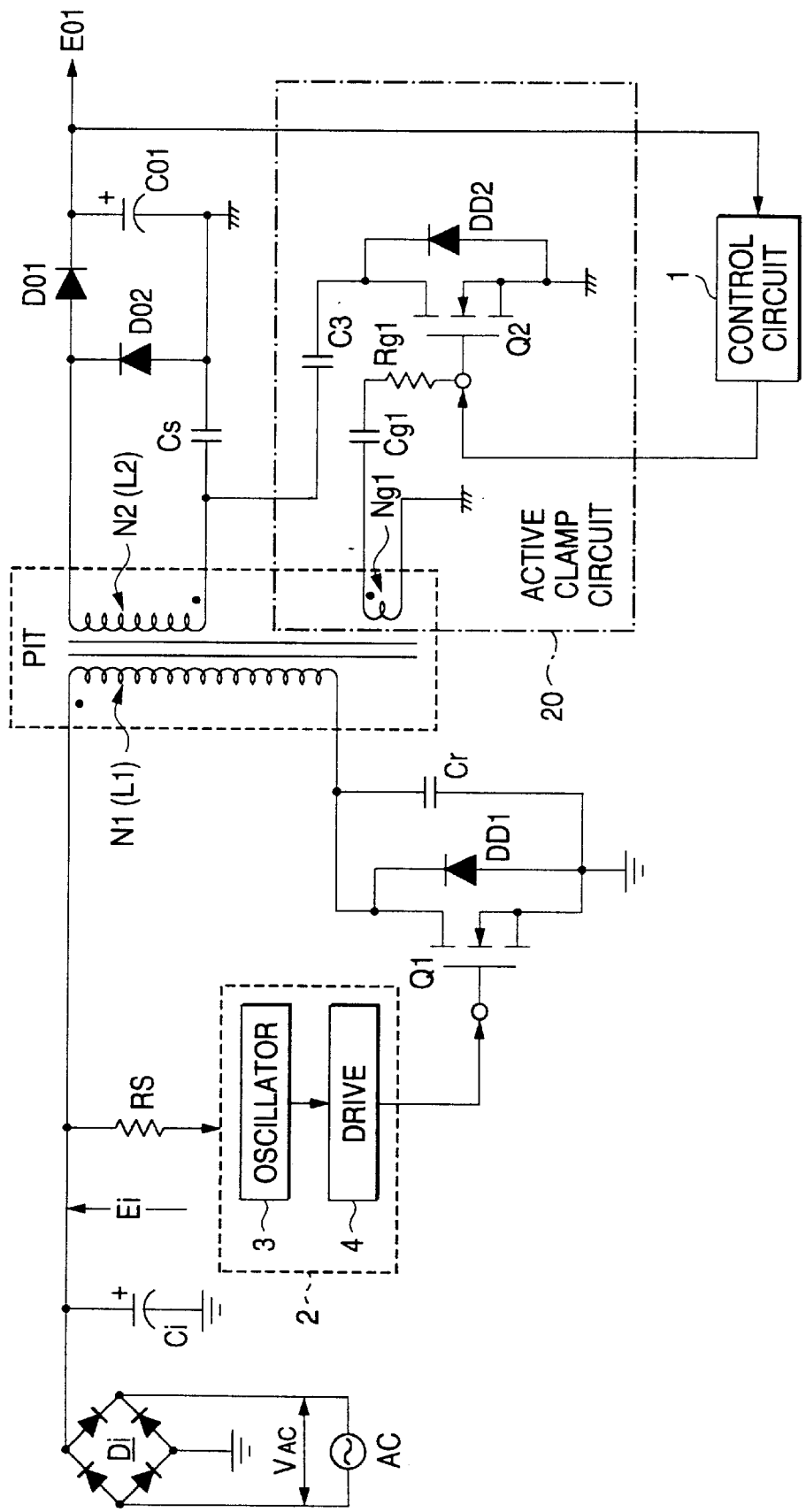
FIG. 5 is a circuit diagram showing the construction of a switching power supply circuit according to a second embodiment of the present invention.

FIG. 5 shows the construction of the switching power supply circuit according to a second embodiment of the present invention. In FIG. 5, the same parts as FIG. 1 are represented by the same reference numerals, and the description thereof is omitted. This is an embodiment of a composite resonance type converter circuit in which a separately-excited type voltage resonance converter using IC and MOS-FET is provided at the primary side and an active clamp circuit 20 of MOS-FET and a double voltage rectifying type current resonance circuit is provided at the secondary side.

The primary voltage resonance converter of the power supply circuit shown in this figure uses the construction of the separately-excited single end system. In this case, MOSFET is used as the main switching element Q1.

The drain of the main switching element Q1 as MOS-FET is connected to the winding-end edge portion of the primary winding Ni, and the source is connected to the earth at the primary side. The parallel resonance capacitor Cr is connected between the drain-source of the main switching element Q1 in parallel. The clamp diode DD1 is also connected between the drain-source of the main switching element Q1 in parallel.

The switching driving portion 2 is provided to drive the main switching element Q1 in the separately-exciting style, and it may be constructed as a single-stone IC. The switching driving portion 2 comprises an oscillating circuit 3 and a drive circuit 4. The switching driving portion 2 achieves power for starting through the line of the rectified smoothed voltage Ei through the starting resistor Rs at the starting time.

In the oscillating circuit 3, an oscillating signal is generated and output to the drive circuit 4. The drive circuit 4 converts the oscillating signal thus input to a drive voltage with which the main switching element Q1 corresponding to MOS-FET can be driven, and then outputs it to the gate of the main switching element Q1, whereby the main switching element Q1 is switched at a predetermined switching frequency fs based on the oscillating signal.

Further, at the secondary side of the circuit shown in FIG. 5, the secondary series resonance capacitor Cs is connected to the winding-start edge portion of the secondary winding N2 in series, and the secondary series resonance circuit (current resonance circuit) is formed by the leakage inductance L2 of the secondary winding N2 and the capacitance of the secondary series resonance capacitance Cs.

That is, the power supply circuit shown in this figure is designed as a composite resonance type switching converter so that the voltage resonance circuit is provided at the primary side and the current resonance circuit is provided at the secondary side.

In this case, the secondary rectifying circuit is formed by connecting two rectifying diodes D01, D02 and a smoothing capacitor C01 as shown in the figure. with the connection style as described above, the construction as a so-called double voltage half-wave rectifying circuit is achieved.

The double voltage half-wave rectifying circuit is designed to repeat an operation that the secondary series resonance capacitor Cs is charged with the current rectified by the rectifying diode D02 at a half period of the alternating voltage achieved by the secondary winding N2, and at the next half period, the rectifying diode D01 is conducted to charge the smoothing capacitor C01 under the state that the potential achieved in the secondary series resonance capacitor Cs is applied. Through this operation, the level corresponding to the double of the alternating voltage level achieved by the secondary winding N2 is achieved as the secondary DC output voltage E01 which is the voltage between both the ends of the smoothing capacitor C01.

Accordingly, in the case where the double voltage half-wave rectifying circuit is provided at the secondary side as described above, if it is sufficient that the level of the secondary DC output voltage E01 is the same level as achieved by the one-time voltage rectifying circuit, the number of turns of the secondary winding N2 can be reduced to about a half of the normal case.

The constituent elements of the active clamp circuit 20 are the same as the embodiment of FIG. 1. The series circuit of the clamp capacitor C3 and the auxiliary switching element Q2 constituting the active clamp circuit 20 is connected to the resonance capacitor Cs in parallel. That is, the clamp capacitor C3 is connected to the connection point between the secondary winding N2 and the resonance capacitor Cs, thereby controlling the charging into the resonance capacitor Cs with the resonance current occurring in the secondary winding N2.

Further, the switching operation of the auxiliary switching element Q2 is PWM-controlled by the control circuit 1 provided at the secondary side.

That is, the secondary DC output voltage E01 is supplied to the control circuit 1, and the control circuit 1 applies the DC control voltage corresponding to the secondary DC output voltage E01 to the gate of the auxiliary switching element Q2 to control the conduction angle of the auxiliary switching element Q2, thereby stabilizing the DC output voltage E01 with respect to the variation of the alternating input voltage VAC or the load power Po.

In the construction as described above, an insulating converter transformer PIT having the structure shown in FIG. 2 is provided. Further, the connection between the primary winding N1 and the secondary winding N2 is the additive connection, thereby achieving the same effect as the power supply circuit shown in FIG. 1.

Figure 6:
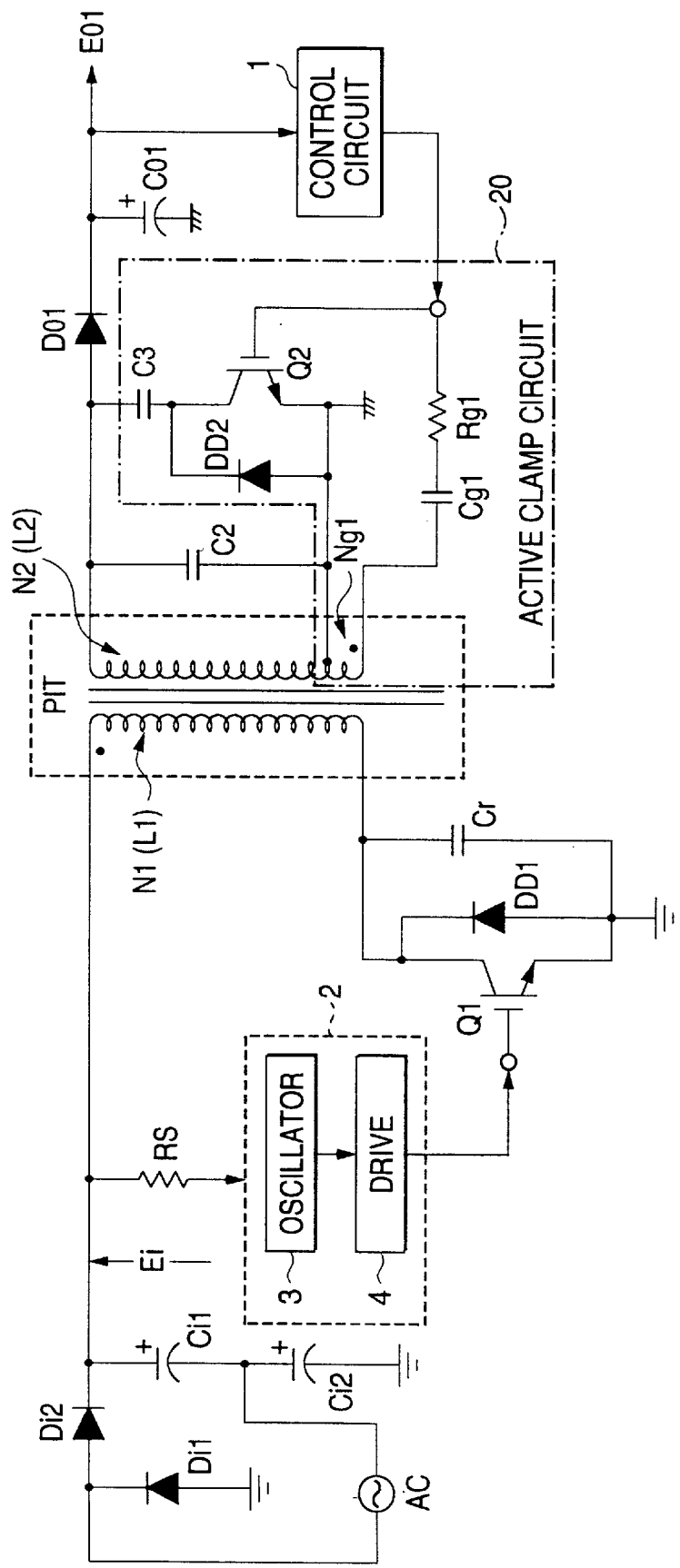
FIG. 6 is a circuit diagram showing the construction of a switching power supply circuit according to a third embodiment of the present invention.

FIG. 6 shows the construction of the switching supply circuit according to a third embodiment. In FIG. 6, the same parts as FIGS. 1 and 5 are represented by the same reference numerals, and the description thereof is omitted.

This is an input voltage double voltage rectifying circuit, and it is designed so that a voltage resonance circuit using IGBT (Insulating Gate Bipolar Transistor) is provided at the primary side, and the combination of an active clamp circuit 20 based on IGBT and a half-wave rectifying type voltage resonance circuit is provided at the secondary side. IGBT is known as having a high switching characteristic.

In the circuit shown in this figure, as the rectifying smoothing circuit system for the alternating input, rectifying diodes Di1, Di2 and smoothing capacitors Ci1, Ci2 are connected as shown in the figure, thereby constructing a so-called double voltage rectifying smoothing circuit.

Further, like the embodiment shown in FIG. 5, the switching driving portion 2 of the oscillation circuit 3 and the drive circuit 4 is provided to the main switching element Q1 based on IGBT which forms the primary voltage resonance type converter.

The collector of the main switching element Q1 based on IGBT is connected to the winding-end edge portion of the primary winding N1, and the emitter is connected to the earth at the primary side. Further, the parallel resonance capacitor Cr is connected between the collector-emitter of the main switching element Q1 in parallel. The clamp diode DD1 is also connected between the collector-emitter of the main switching element Q1 in parallel.

The switching drive portion 2 is provided to drive the main switching element Q1 in the separately-excited style, and thus for example, it is constructed as a single-store IC. The switching drive portion 2 achieves power for starting from the line of the rectified smoothed voltage Ei through a starting resistor Rs at the starting time.

The oscillation circuit 3 generates an oscillation signal and outputs it to the drive circuit 4. The drive circuit 4 converts the oscillation signal thus input to a drive voltage with which the main switching element Q1 can be driven, and outputs it to the gate of the main switching element Q1 whereby the main switching element Q1 is switched at a predetermined switching frequency fs based on the oscillation signal.

In the construction as described above, SIT (Static Induction Thyristor) or the like may be used as the main switching element Q1, for example.

The construction of the secondary side of the power supply circuit shown in this figure is basically the same as that of FIG. 1. However, it is different in that IGBT is used as the auxiliary switching element Q2 of the active clamp circuit 20.

In the construction as described above, the insulating converter transformer PIT having the construction shown in FIG. 2 is also provided, and the connection between the primary winding N1 and the secondary winding N2 is set to the additive connection, so that the same effect as the power supply circuit of FIGS. 1 and 5 can be achieved.

The embodiments have been described, however, various types other than those shown in the figures, such as the combination of the primary voltage resonance type converter system and the secondary rectifying circuit, may be considered for the power supply circuit of the present invention. Further, the driving system of the active clamp circuit is not limited to the self-exciting type construction shown in each figure, and another self-exciting type or a separately-excited type may be used.

As described above, according to the present invention, with respect to the insulating converter transformer of the switching power supply circuit which is of a composite resonance type and provided with an active clamp circuit at the secondary side, the primary winding and the secondary winding have a so-called inverse winding relationship, and the primary winding and the secondary winding are connected to each other through additive connection. In this structure, the primary magnetic flux and the secondary magnetic flux act to offset each other. Therefore, in the present invention, the core of the insulating converter transformer is not required to be provided to any gap for suppressing saturation.

As described above, it is unnecessary to provide a gap to the core of the insulating converter transformer. Therefore, in the present invention, a step of forming a gap is omitted in the process of manufacturing the insulating converter transformer, and also the manufacturing management is easily carried out. That is, the manufacturing efficiency of power supply circuits each having an insulating converter transformer can be enhanced.

Further, since no gap is formed, occurrence of a fringe magnetic flux in the neighborhood of the gap can be avoided, so that the heat and the power loss in the primary winding and the secondary winding can be greatly suppressed. Particularly, depending on the structure of the insulating converter transformer according to the invention, the current amount flowing in the primary winding and the secondary winding can be set to be less than ever, so that the suppression of the heat and the reduction of the power loss can be further promoted.

Further, in the structure of the insulating converter transformer PIT according to the invention, the leakage inductance can be also reduced. Therefore, even under the condition of the load and low alternating input voltage, the ZVS operation can be guaranteed and the reliability as the power supply source can be enhanced.

What is claimed is:

1. A switching power supply circuit comprising:

switching means formed to have a main switching element for intermittently outputting a DC input voltage;

a primary parallel resonance capacitor provided so as to form a primary parallel resonance circuit for making the operation of said switching means a voltage resonance type;

an insulating converter transformer having a structure that a required coupling coefficient to establish the loose coupling between the primary side and the secondary side is achieved, said insulating converter transformer transmitting the output of said switching means achieved at the primary side to the secondary side;

a secondary resonance circuit formed by connecting a secondary resonance capacitor to a secondary winding of said insulating converter transformer;

DC output voltage generating means that receives an alternating voltage achieved at the second winding of said insulating converter transformer to carry out a rectifying operation, thereby achieving a secondary DC output voltage;

secondary active clamp means that is formed in parallel to said secondary resonance capacitor so as to have a series connection circuit comprising a clamp capacitor and a secondary auxiliary switching element; and voltage stabilizing means for applying a DC control signal based on the secondary DC output voltage to said secondary auxiliary switching element to execute conduction angle control on said secondary auxiliary switching element to stabilize the secondary DC output voltage, wherein said insulating converter transformer has a core that is not provided with any gap for prohibiting saturation, said primary winding and said secondary winding are wound around said core in the opposite winding directions and said primary winding and said secondary winding are connected to each other so that additive polarity is established.

* * * * *